SPEED CONTROL SERVO SYSTEM HAVING RAPID REDUCTION
OF LARGE ORDER SPEED DIFFERENCE ERROR SIGNALS
Filed March 12, 1965

HAROLD V. CLARK
INVENTOR.

BY Robert G. Clay

ATTORNEY 3,382,423
Patented May 7, 1968

3,382,423

SPEED CONTROL SERVO SYSTEM HAVING RAPID REDUCTION OF LARGE ORDER SPEED DIFFERENCE ERROR SIGNALS

Harold V. Clark, Menlo Park, Calif., assignor to Ampex Corporation, Redwood City, Calif., a corporation of California Filed Mar. 12, 1965, Ser. No. 439,372
7 Claims. (Cl. 318—318)

ABSTRACT OF THE DISCLOSURE

A servo system for synchronizing the speed of a rotary element to a reference. A motor driving the rotary element has a speed varied by a control means in accordance with the magnitude of an error signal. The error signal has a magnitude proportional to the difference between the frequency of a speed indicating signal representative of the speed of the motor and rotary element, and the frequency of a reference signal, whereby the speed of the rotary element is synchronized to the reference signal. In order to avoid overcompensation in response to excessive frequency difference error signals, provision is made to divide same by a predetermined factor.

Figure 1:
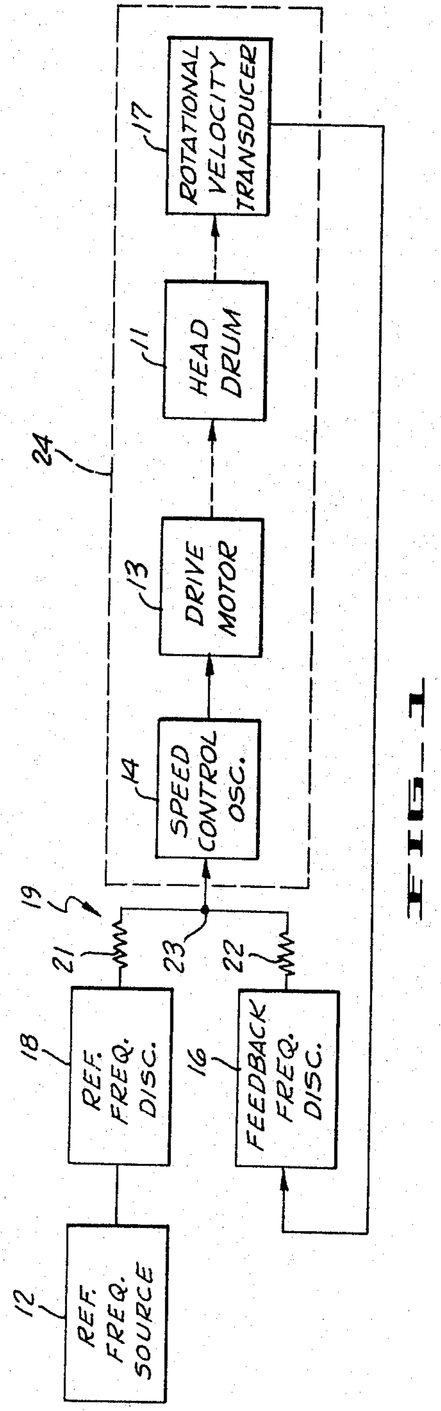

This invention relates to servo systems of the type which act by comparing timing formation derived from a first signal and timing information derived from a second signal to alter one of the signals in a manner which brings that signal into synchronism with the other signal, and is more particularly directed to a servo system of this type which is arranged to reduce extreme differences or errors between the timing informations derived from the respective signals to values within the capture range of a precision servo which is operable to bring the signals into substantially exact synchronism. The servo system of the invention is particularly suitable for use in television tape recording and reproducing systems to assist in the synchronization of rotary head speed and/or tape speed to a reference signal.

Various television tape recording and reproducing systems have been advanced to facilitate switching from one source of television signal information, such as a television camera employed for pickup of a live show in the studio, to another source such as magnetic tape recording and reproducing apparatus having a tape with signal information recorded thereon. In this manner, programming material from a number of different sources may be interposed to provide a composite program for transmission, as well as to provide various special effects in a transmitted or recorded program. In order to prevent rollover of a picture displayed on the screen of a television receiver at the times the transmitted signal is swtiched between a television magnetic tape recorder and another television signal source, extremely close synchronization is required between the respective signals therefrom. Such synchronization is conventionally accomplished by precisely controlling the speed of the driving motor which controls the rotational velocity of the magnetic head scanning drum of the tape apparatus, as well as by controlling the speed of the capstan drive motor, in accordance with external reference signals. More particularly, with reference to the scanning drum, a coarse control of the drum velocity is facilitated by developing an error signal which varies in accordance with the difference between a reference signal and a signal proportional to the drum velocity, or a signal derived from the control track of the tape. Typically, the reference signal is a vertical synchronizing signal derived from a local studio reference sync generator, or a network master sync generator. The resulting error signal is employed to vary the speed of the drive motor in compensatory relation to the error signal and thereby synchronize the drum velocity to the vertical sync reference signal. In this manner, frame-by-frame lock-up of the reproduced tape television signal and the locally generated television signal is obtained. With the coarse frame-by-frame lock-up established, precise phasing and accurate synchronism is achieved by establishing a line-by-line lock-up of the reproduced and locally generated signals. In this regard, fine control of drum velocity is obtained by high speed servoing of drive motor speed in accordance with a second error signal varying in accordance with the difference between the horizontal sync component of the composite video information signal pre-recorded on the magnetic tape, and a reference horizontal sync signal derived from a local studio reference sync generator or a master sync generator. In a similar manner, coarse and fine synchronization between the reference and tape speed is effected by controlling the capstan drive motor in accordance with an error signal developed by comparison of the reference and a control track signal recorded on the tape. It is, of course, necessary in both of the foregoing cases to first achieve vertical, or frame-by-frame lock-up, before horizontal, or line-by-line lock-up becomes effective.

Heretofore, lock-up between the rotary head or control track signals and the external reference signals was difficult, if not impossible to obtain for considerable differences between the frequencies of the reference signal and the signals derived from the rotating drum and the control track. More particularly, for very large vertical error signals, the slip rate or difference between the signal frequencies before frame-by-frame lock-up occurs may exceed the capture range of the vertical synchronization speed adjusting servos associated with the head drum and capstan. This results in an average of zero control signal and inability of the servos to synchronize the reproduced tape signal to the external reference signal such that not even frame-by-frame lock-up is effected. For example, vertical synchronization servos are typically capable of effecting frame-by-frame lock-up for frequency differences within ±½ cycle of a 60 cycle center reference frequency. Thus, where the drum speed, for example, has been previously synchronized to the 60 cycle reference and the reference is switched to another reference of, for example 62 cycles, the resulting frequency difference is outside of the ±½ cycle capture range of the vertical synchronization servo, and same cannot effect lock-up. Rollover of the picture displayed on the screen of a television receiver thus occurs until variations in drum speed are such as to produce a frequency difference error signal within the ±½ cycle capture range of the servo. The foregoing likewise applies where it is desired to obtain lock-up with a power line instead of a more precise reference such as a local studio synchronizing reference.

It is therefore an object of the present invention to provide an improved servo system for sensing the difference between two signals and automatically reducing the difference to a value within the capture range of a servo for adjusting one of the signals into substantially precise equality with the other signal.

Another object of the invention is the provision of a speed control servo system for facilitating synchronization or phase lock between a rotary head, or a drive capstan of magnetic tape recording and reproducing apparatus and external reference signals over a relatively wide range of frequency difference therebetween.

Still another object of the invention is to provide servo systems of the class described for effecting reliable lock-up of the head drum and capstan speed adjusting servos of magnetic tape recording and reproducing apparatus under extreme conditions of asynchronism with reference sync signals.

Yet another object of the invention is to provide magnetic tape recording and reproducing apparatus having supplementary speed adjusting servo systems associated with the rotary head drum and capstan thereof to rapidly servo their speeds to values approaching synchronization with external reference signals and for which the frequency difference therebetween are within the capture ranges of additional servo systems associated with the drum and capstan capable of substantially precisely effecting phase lock thereof to the reference signals.

A further object of the invention is the provision of a servo system which is self-compensating for variations in sensitivity.

A still further object of the invention is the provision of a servo system of the class described having an open loop control tending to rapidly over-adjust an output signal to an input reference signal and a closed loop control tending to prevent such over-adjustment.

Figure 2:
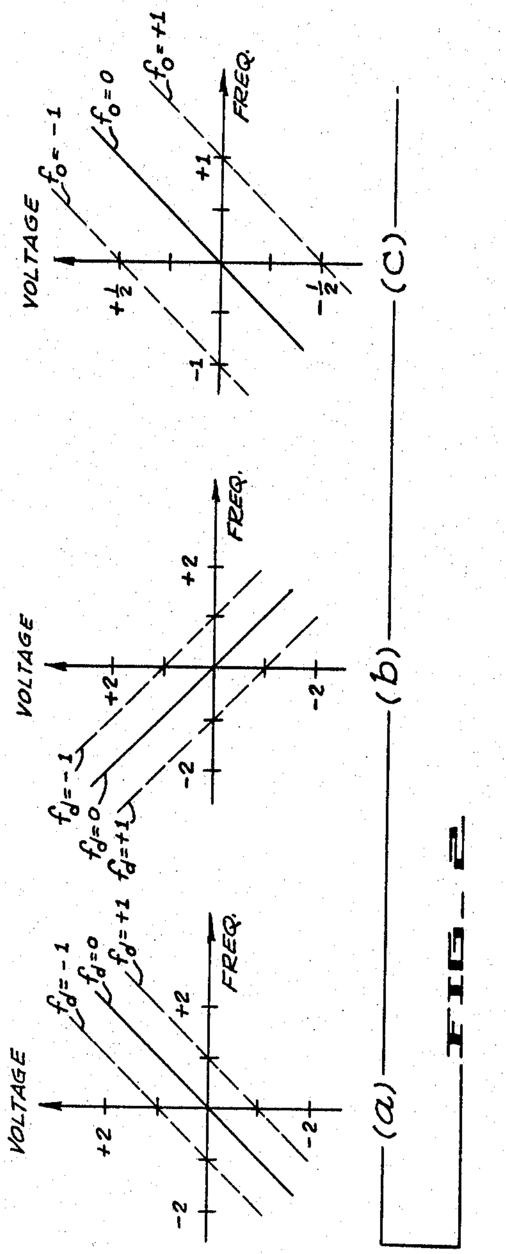

Additional objects and advantages of the invention will become apparent upon consideration of the following description in conjunction with the accompanying drawings, wherein:

FIGURE 1 is a block diagram of a servo system in accordance with the invention; and FIGURE 2, portions A-C, are graphs of voltage versus frequency depicting the sensitivity of various components of the servo system.

In basic respects the servo system of the present invention includes means for producing a first signal which is to be synchronized to the frequency of a reference signal. A control means is provided for varying the frequency of the first signal in accordance with the magnitude of an error signal. The error signal is developed by a comparison means which receives signals from a reference frequency discriminator means and a feedback frequency discriminator means. The signals from the discriminator means have magnitudes which are respectively proportional to the frequency of the reference signal and the frequency of the first signal. The reference and feedback discriminator means have inversely related sensitivity characteristics, and it is particularly important to note that the comparison means is arranged to divide the signals from the discriminator means by a fixed factor while combining same to produce the error signal. As a result, the error signal is proportional to the frequency difference between the reference and first signal, as divided by the fixed factor. The control means is in turn effective to vary the frequency of the first signal in accordance with the error signal whereby the frequency difference between the reference and first signals is reduced by the fixed factor. This fixed factor is dependent on the gain of the feedback loop which includes the feedback discriminator means coupled between the output of the means for producing the first signal and the comparison means. By varying the feedback loop gain, the frequency difference may be correspondingly varied. In effect, the servo system of the present invention is a combination of an open loop and a closed loop control, the open loop tending to overadjust the frequency of the first signal in direct relation to changes in the frequency of the reference signal and the closed loop tending to prevent the overadjustment. As a result, the servo system operates to rapidly lock the frequency of the first signal in close synchronism with the reference frequency such that any remaining frequency difference therebetween is sufficiently small as to be within the capture range of any more precise servos that may be employed to effect lock-up between the reference and first signals.

Considering now the invention in greater detail with reference to FIGURE 1, the servo system will be seen to be therein depicted in conjunction with a rotary head drum 11 of magnetic tape recording and reproducing apparatus to synchronize the head velocity to an external reference frequency source 12, such as a local studio reference sync generator or a network master sync generator. The servo system is also particularly useful for obtaining synchronism where a power line signal is employed as the reference inasmuch as power line frequency may vary widely. In accordance with conventional practice, the head drum 11 is driven by a drive motor 13 the speed of which is varied in accordance with the frequency output of a speed control oscillator 14. The oscillator frequency, and therefore the rotational velocity of the motor and head drum, is varied as a direct function of the magnitude of voltage applied to the oscillator input. In order to accurately hold the head drum velocity constant, the recording and reproducing apparatus conventionally includes both coarse and fine speed adjusting servos which operate to synchornize the head drum velocity to a suitable reference in a well known manner. In this regard, and as previously mentioned, coarse control is conventionally accomplished by synchronizing the head drum velocity to the fourth multiple of a vertical reference frequency of 60 c.p.s. In this way, an average drum speed of 240 r.p.s. can be accurately maintained in synchronism with the vertical reference frequency. However, the instantaneous angular position or velocity of the drum varies within narrow limits about the average velocity, and although synchronism is maintained between each farme of a television signal reproduced from magnetic tape and the reference, individual lines of the frame are not in synchronism with the reference. The fine control accomplishes this latter end of synchronizing the lines of each frame to the reference. Horizontal sync pulses of the recorded signal are compared to the horizontal sync component of the reference to develop a high speed phase error signal which is employed to correct instantaneous deviations in the drum motor velocity from the average velocity and thereby achieve the desired fine synchronism. Both the vertical and horizontal synchronizing error signals are applied to the speed control oscillator 14 by conventional circuitry which functions in a well known manner to vary the oscillator frequency to in turn appropriately control the velocity of the head drum drive motor 13. Inasmuch as the speed control circuitry and coarse and fine speed adjusting servos mentioned above are well known, same are not included in the drawings in the interest of simplicity nor described in specific detail herein. For details of these servos reference may be had to U.S. Patents 3,097,267 and 3,017,462.

It will be appreciated that operation of the conventional coarse and fine speed adjusting servos is dependent upon the frequency difference between the head speed and reference signal being within the capture range of the servos. More particularly, when the vertical synchronizing error signal is very large, thus representing an extreme frequency difference, the coarse servo is unable to lock the average drum speed in synchronism with the reference, and of course the fine servo is totally inoperative. Typically, the capture range of the coarse servo is of the order of ±½ c.p.s. of the vertical reference frequency, which in most instances is sufficient to effect lock-up. However, under extreme conditions such as may exist, for example, when the tape apparatus is switched from one reference frequency source to another, the frequency difference exceeds the capture range of the servo. In this regard assume that the head drum has been operating in synchronism with a 60 c.p.s. reference frequency when the apparatus is switched to a different reference source having a frequency of 61 c.p.s. The frequency difference would thus be normally outside of the capture range of the coarse servo such that same would be ineffective to lock-up the drum with the new reference. As a result, roll-over of the picture produced on the screen of a receiver receiving the signal would occur.

The foregoing is prevented, however, by the servo system of the present invention which operates to rapidly reduce the frequency difference in accordance with a fixed division factor. For example, with a division factor of two, the above-noted frequency difference is rapidly reduced from 1 c.p.s. to ½ c.p.s., which is within the ±½ c.p.s. capture range of the conventional coarse adjusting vertical synchronizing servo. Phase lock-up between the head drum and new reference is thus rapidly effected, despite the initial extreme frequency difference therebetween. More particularly, the servo system of the present invention includes a feedback frequency discriminator 16 which receives a signal having a frequency directly proportional to the velocity of the head drum 11 from a rotational velocity transducer 17, such as a tachometer or the like, driven by the head drum. The discriminator 16 develops a direct current output voltage which varies in proportion to the frequency of the signal generated by the transducer 17. In addition, a reference frequency discriminator 18 receives the signal from the reference frequency source 12 and develops a direct current output voltage which varies in proportion to the frequency of the reference signal. As noted previously, the reference and feedback discriminators have inversely related sensitivity characteristics which are desirably equal in magnitude, or inversely proportional to the ratio of the center frequencies of the respective discriminators if the reference and head drum output frequencies are different. Thus, in the case of inversely related sensitivities of equal magnitude, the sensitivity characteristics of the reference and feedback discriminators are, for example, as depicted in FIGURES 2(*a*) and (*b*) respectively, which illustrate a 1:1 ratio between output voltage and frequency. In this regard, it is to be noted that the characteristics have equal, but opposite slopes and the frequencies are normalized and shifted to zero as a center operating frequency. Thus, $f_d=0$ represents the center operating frequency of the discriminators, while $f_d=\pm1$ represent operating frequencies one unit above or below the center frequency. A frequency increase of one unit in reference frequency produces a voltage increase of one unit in the output voltage of discriminator 18. A similar frequency increase of one unit in feedback or head drum frequency, produces a voltage decrease of one unit in the output voltage of discriminator 16. Conversely, one unit frequency decreases at the inputs of the discriminators 16, 18 respectively produce a one unit voltage decrease and increase at the outputs thereof. In the case of different reference and head drum frequencies of, for example, 60 c.p.s. and 240 c.p.s., respectively, a ratio of 1:4, the feedback discriminator would have a sensitivity of −¼ that of the reference frequency discriminator.

Considering now the comparison means for developing an error signal proportional to the difference between the head drum and reference frequencies for application to the speed control oscillator 14, it is to be noted that same is preferably provided as a summing device 19 such as a voltage divider having equal resistances 21, 22 joined at a common center tap 23. The opposite ends of the divider are respectively coupled to the outputs of reference discriminator 18 and feedback discriminator 16, while the center tap 23 is coupled to the input of speed control oscillator 14. The error voltage developed at center tap 23 is given by the algebraic sum of the voltages applied to its opposite ends, divided by a fixed factor, namely two in the present case. Inasmuch as the reference and feedback discriminators 18 and 16 have inversely related characteristics, the error voltage is thus proportional to the differences between the reference and output frequencies divided by the fixed factor of two in the instant case.

With the 1:1 voltage to frequency ratio characteristics of the feedback and reference frequency discriminators, and a 1:2 voltage to frequency ratio characteristic, as illustrated in FIGURE 2(*c*), for the output circuit 24 comprising the speed control oscillator 14, drive motor 13, head drum 11, and rotational velocity transducer 17, several specific situations of circuit conditions are next considered. First, consider the feedback and reference discriminators 16 and 18 to be operating at their center frequencies $f_d=0$, and the output circuit 24 to be operating at its center frequency $f_o=0$. With the reference frequency and output frequency in synchronism and thus both having normalized shifted to zero values of zero, the voltage outputs of the reference and feedback frequency discriminators, as observed from FIGURES 2(*a*) and (*b*), are zero. The error voltage applied to oscillator 14 is hence zero and consonant with the normalized shifted to zero output frequency of zero observed from FIGURE 2(*c*). Now consider the reference frequency to shift up one unit of frequency such that the instantaneous difference between the output and reference frequencies is one unit. The output of the reference discriminator 18 increases one unit of voltage and tends to increase the output frequency by two units. This is synonymous with a rapid adjustment of motor speed and drum velocity upward towards, and in fact beyond, synchronism with the reference frequency, i.e., the adjustment of the output frequency would normally tend to overshoot the reference frequency. However, the feedback loop including the feedback discriminator 16 and resistor 22 has a degenerative effect on the output frequency change with a net result that the difference between the reference and output frequencies is rapidly reduced, in the present case, to ½ the initial difference of one frequency unit. At this time the normalized shifted to zero output frequency is hence +½ and the output voltage of feedback discriminator 16 is correspondingly −½ unit. The error voltage applied to the speed control oscillator 14 is then +¼ unit which from FIGURE 2(*c*) corresponds to the output frequency of +½ unit.

Next consider the case where the reference and output frequencies are initially in synchronism and, for example, the operating frequency of the oscillator 14 drifts to change the operating frequency of the output circuit 24 to $f_o=-1$. A difference of −1 frequency units thus exists between the output frequency and reference frequency. However, this is rapidly reduced to −½ by the servo system of the present invention such that the frequency signal applied to the feedback discriminator 16 is −½. The output voltage of the feedback discriminator is then +½, while the output voltage of reference discriminator 18 is zero, the normalized shifted to zero reference frequency being zero. The error voltage applied to oscillator 14 is thus +¼, which corresponds to the output frequency of −½.

Finally, consider the case of the operating frequencies of the reference and feedback discriminators simultaneously shifting to $f_d=-1$, while the reference and output frequencies are in synchronism, i.e., are zero in normalized shifted to zero units. The voltage outputs of feedback and reference discriminators 16 and 18 are thus −1 and +1. The error voltage applied to oscillator 14 is thus zero, which corresponds to the output frequency of zero.

Although the reference and output frequency difference is reduced by a factor of ½ in the previously described example, it should be noted that the factor depends on the feedback loop gain and may be increased by increasing the gain. In the described case of a factor of ½, the gain is unity. If the gain is doubled, which may be accomplished by doubling the sensitivity of the feedback discriminator, and therefore correspondingly doubling the sensitivity of the reference discriminator, or alternatively by doubling the sensitivity of the output circuit 24, or providing an amplifier of appropriate gain following the summing network, the difference is reduced by a factor of ⅓. Further increases in gain provide correspondingly increased reductions in frequency difference.

In an analogous manner, the servo system of the present invention may be employed to facilitate phase lock-up between the capstan drive motor of magnetic tape recording and reproducing apparatus and an external reference. Such a system is substantially similar to that just described for facilitating phase lock-up between the rotary head drum and reference, the only difference being in the manner that a feedback signal representative of capstan motor speed is derived. In place of the output of a tachometer, or equivalent rotational velocity transducer, a control track signal reproduced from magnetic tape pulled by the capstan represents the output frequency signal proportional to capstan motor speed. Otherwise the servo system is the same and functions in a similar manner to rapidly reduce differences between output and reference frequencies to values within the capture range of speed adjusting servos conventionally associated with the capstan drive motor to effect phase lock thereof to the reference.

Although the invention has been hereinbefore described with respect to a single embodiment thereof, it will be appreciated that numerous modifications and variations may be made therein without departing from the true spirit and scope of the invention, and thus it is not intended to limit the invention except by the terms of the appended claims.

What is claimed is:

1. A servo system comprising means for producing an output signal of varying frequency, means for producing a reference signal having a reference frequency, means coupled in receiving relation to said output and reference signals for developing an error signal varying in magnitude in accordance with the difference between the frequencies thereof divided by a predetermined factor greater than unity, and control means coupled in receiving relation to said error signal for varying the frequency of said output signal in proportion to the magnitude of said error signal.

2. A servo system comprising means for producing a first signal, means for producing a second signal, control means for varying the frequency of said first signal in accordance with the magnitude of an error signal, first and second discriminator means for respectively developing signals having magnitudes varying in proportion to the frequencies of said first and second signals, and comparison means for receiving the signals from said first and second discriminator means and developing an error signal proportional thereto, said error signal having a magnitude proportional to the difference between the frequencies of said first and second signals divided by a predetermined factor, said error signal coupled to said control means.

3. A servo system comprising output means for generating an output signal of varying frequency, a reference source for generating a reference signal having a reference frequency, control means coupled to said output means for varying the frequency of said output signal in accordance with the magnitude of a signal applied to its input, a first discriminator coupled to said output means for generating a first discriminator signal having a magnitude varying in proportion to the frequency of said output signal, a second discriminator coupled to said reference source for generating a second discriminator signal having a magnitude varying in proportion to the frequency of said reference signal, said first and second discriminators having inversely related sensitivity characteristics, and summing means coupled to the outputs of said first and second discriminators and to the input of said control means for applying a signal thereto proportional to the algebraic sum of said discriminator signals.

4. A speed control servo system comprising an electric motor, means for generating a speed indicating signal having a frequency varying in proportion to the speed of said motor, a reference source for generating a reference signal having a reference frequency, speed control means coupled to said motor for varying the speed thereof in direct relation to the magnitude of a signal applied to its input, means coupled in receiving relation to said speed indicating and reference signals for developing an error signal having a magnitude varying in direct relation to the difference between the frequencies thereof divided by a predetermined factor greater than unity, and means for coupling said error signal to the input of said speed control means.

5. A speed control servo system according to claim 4, further defined by said means for developing an error signal comprising a first discriminator coupled in receiving relation to said speed indicating signal for generating a first discriminator signal having a magnitude varying in inverse relation to the frequency of said speed indicating signal, a second discriminator coupled in receiving relation to said reference signal for generating a second discriminator signal having a magnitude varying in direct relation to said reference frequency, and voltage summing means coupled to said first and second discriminators and to the input of said speed control means for applying a signal thereto proportional to the algebraic sum of said discriminator signals.

6. In magnetic tape recording and reproducing apparatus including a drive motor, means for generating a speed indicating signal having a frequency varying in proportion to the speed of said motor, a reference source for generating a reference signal having a reference frequency, and precision servo means coupled in receiving relation to said speed indicating and reference signals and including speed control means coupled to said motor to vary the speed thereof in proportion to the frequency difference between said speed indicating and reference signals to lock the speed and phase of said motor in synchronism with said reference signal, the improvement comprising a first discriminator coupled in receiving relation to said speed indicating signal for generating a first discriminator signal having a magnitude varying in inverse relation to the frequency of said speed indicating signal, a second discriminator coupled in receiving relation to said reference signal for generating a second discriminator signal having a magnitude varying in direct relation to said reference frequency, and a voltage divider having its opposite ends respectively coupled to said first and second discriminators in receiving relation to the signals therefrom and a center tap coupled to said speed control means.

7. In magnetic tape recording and reproducing apparatus, the combination comprising a rotary magnetic transducer head drum, a drive motor coupled to said drum for rotating same, a rotational velocity transducer coupled to said drum for producing a signal varying in frequency in proportion to the rotational velocity of said drum, speed control oscillator means coupled in energizing relation to said motor for varying the velocity thereof in direct relation to the magnitude of a signal applied to its input, a reference frequency source, a feedback frequency discriminator coupled to said transducer for generating a signal having a magnitude varying in inverse relation to the frequency of the signal from said transducer, a reference frequency discriminator coupled to said reference frequency source for generating a signal having a magnitude varying in direct relation to the reference frequency, and a voltage divider having its opposite ends respectively coupled to said reference and feedback frequency discriminators in receiving relation to the signals therefrom, said divider having a center tap coupled to the input of said speed control oscillator.

References Cited

UNITED STATES PATENTS

| | | | |
|---|---|---|---|
| 2,775,724 | 12/1956 | Clark | 317—5 |
| 3,084,307 | 4/1963 | Landis | 317—5 |
| 3,198,985 | 8/1965 | Haskell | 317—5 |

ORIS L. RADER, *Primary Examiner.*

J. J. BAKER, *Assistant Examiner.*